Nov. 28, 1944.  A. RAPPL  2,363,621
WINDSHIELD CLEANER
Filed Feb. 2, 1942
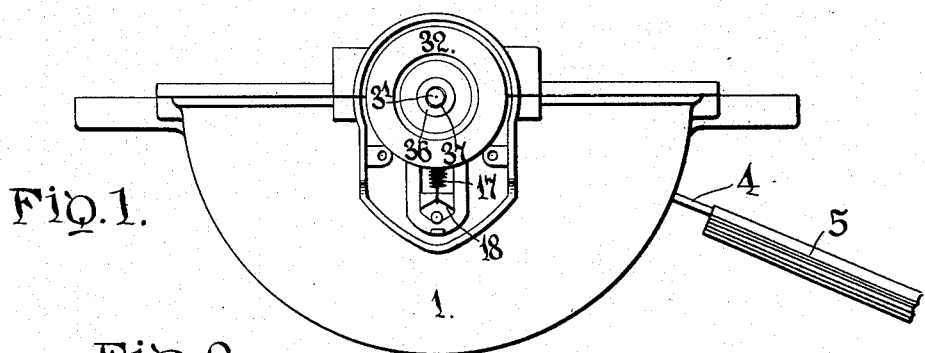
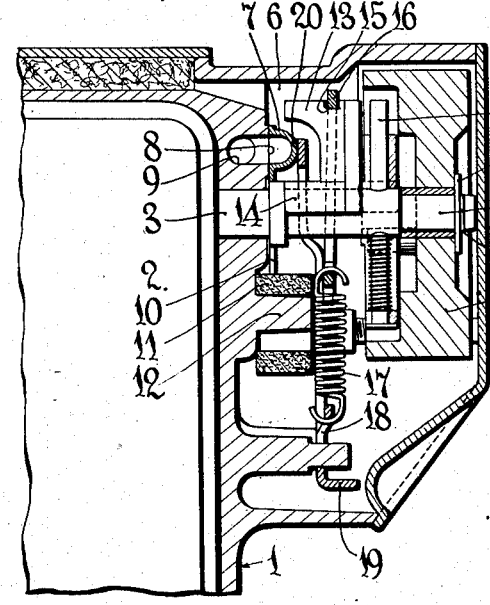
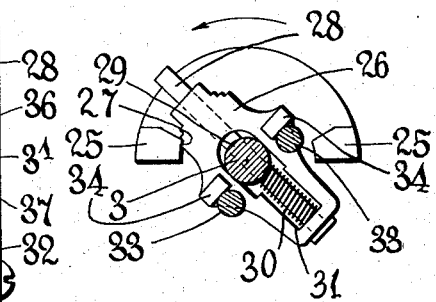
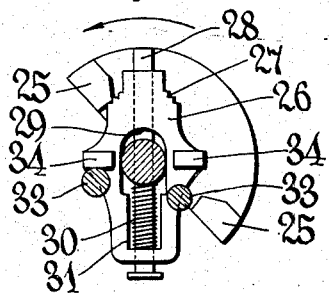
INVENTOR
Anton Rappl,
BY
Beau, Brooks, Buckley & Beau.
ATTORNEYS Patented Nov. 28, 1944

2,363,621

UNITED STATES PATENT OFFICE 2,363,621

WINDSHIELD CLEANER

Anton Rappl, Buffalo, N. Y., assignor to Trico Products Corporation, Buffalo, N. Y.

Application February 2, 1942, Serial No. 429,241

20 Claims. (Cl. 15—253)

This invention relates to a windshield cleaner of the fluid pressure type wherein the wiper is oscillated over the windshield surface. The stroke of the wiper is dependent upon the speed of motor operation with the extent of wiper movement increasing as the speed of the motor increases. This is due to the inertia set up in the fast moving wiper and its driving parts. Such overtravel or whipping of the wiper at the end of each stroke at high speed is objectionable because it not only causes the wiper to strike against the windshield molding or frame and mar the finish thereof but it also produces a distracting noise incidental to such striking.

The object of the present invention is to provide an improved windshield cleaner in which the overtravel is controlled in a manner to secure a generally uniform path and extent of travel for the wiper.

The invention further has for its object to provide a windshield cleaner in which the wiper movement is governed in accordance with the speed of operation for insuring a more uniform operation.

In the drawing:

Fig. 1 is an elevation of the improved windshield cleaner with the cover plate of the valve housing removed;

Fig. 2 is a vertical sectional view through the valve mechanism showing the timing or governing arrangement;

Fig. 3 is an exploded view in perspective of the valve kicker and its speed regulated actuator;

Fig. 4 is a view depicting the actuator in a speed responsive position and at the end of its kicker actuating stroke, the kicker being poised substantially on its dead-center position ready for spring actuation; and Fig. 5 is a similar view showing the actuator displaced radially in response to high motor speed and at the start of its kicker actuating movement.

Referring more particularly to the drawing, the numeral 1 designates a windshield cleaner motor having an arcuate chamber in which oscillates a piston or vane 2 carried by the shaft 3. As herein depicted both ends of the shaft extend from the motor chamber, one end being connected to the wiper carrying arm 4 on the outer end of which is mounted the wiper blade 5, while the opposite end projects into the valve chamber or compartment 6 and supports a valve 7 for oscillatory movement over a valve seat 8 having suitable port means 9 for operatively subjecting the piston to the required operating pressure. The valve is limited in its movement by a pair of legs, one of which is shown at 10, straddling a cushioning stop ring 11 loosely mounted on the mounting pin 12. A kicker 13 having a segmental hub 14 is pivotally mounted on the shaft 3 within the chamber 6, the kicker having a seat 15 engaged by a hanger 16 to which one end of a snap spring 17 is hung, the opposite end of the spring being engaged through an eye 18 in a valve pressure plate 19 which bears on the valve at 20 to urge the valve lightly toward its seat. As the piston moves under the urge of the pressure fluid the kicker is gradually moved thereby across the line of spring force to permit the spring quickly snapping the kicker to its operative position on the opposite side. This operation is quite generally found in the present day windshield cleaner and referred to in Patent No. 2,032,319, granted on February 25, 1936, to Erwin C. Horton and Henry Hueber.

The kicker is connected to the actuating shaft in a manner to regulate the moment of kicker operation, this regulation being determined through a speed responsive control. In the specific embodiment shown herein the kicker is provided with a pair of stop shoulders 25 adapted to be alternately engaged by a governor in the form of an actuator member 26 interposed between the spaced shoulders 25 with a predetermined amount of play. When the actuator 26 engages a shoulder and thereafter carries the kicker along with it across a dead center position with respect to the line of force of the spring 17, the latter will then quickly move the kicker independently of the actuator 26 and effect a shifting of the valve to reverse the pressure differential on the piston.

The actuator is of such design and construction as to advance the time or moment at which the kicker is moved across the dead center position when the motor is operating at a fast speed. For this purpose the actuator is provided with an active part 27 having two converging series of face portions in the form of steps which are adapted to selectively engage the shoulders 25. Should the active part at its greatest width engage the shoulders it will advance the time in the cycle of operation at which the kicker is moved across dead center, or in other words it advances the moment at which the spring 17 becomes effective. If a narrower section of the active part engages the shoulders the functioning of the spring will be correspondingly delayed. To effect this selective engagement of the active part with the shoulders the actuator is mounted for radial movement on a shaft carried pin 28. The actuator is provided with a seat 29 which normally rests on the shaft 3 under the urge of a coil spring 30 which latter is arranged within an opening 31. The spring is suitably supported on a diametral extension of the pin 28 and may be adjustable to regulate its sensitivity of response.

The actuator may be adjusted by any suitable means, preferably in an automatic manner as will now be described. For this purpose an inertia member in the form of a weighted disk 32 is rotatably mounted on the shaft, or a reduced extension 3' thereof, and is provided with a pair of cam lugs or surfaces 33 which normally engages a pair of lifters or shoes 34 extending from the actuator 26, the arrangement being such that the spring 30 will act to hold both shoes 34 normally engaged with the lugs 33 and thereby establish a yieldable driving connection between the shaft and disk for oscillation. However, during fast operation of the motor the inertia in the disk 32 will carry through from the preceding stroke into the beginning of the following piston stroke and advance the forward one of the lugs 33 to exert a camming tendency on its shoe 34 in addition to establishing the yieldable driving connection between the shaft and disk for reversing the rotation of the latter. This camming tendency if sufficient to more than counteract the urge of spring 30, will move the actuator outwardly to dispose a new step portion 27 in the path of the shoulders 25. Now, at the end of this stroke, as determined by the shifting of the valve, the weighted disk will be carried on by its inertia while the piston will have started back in the opposite direction. Consequently, the previously driving shoe 34 will relax and permit the spring 30 to impart inward movement to the actuator before the companion shoe reestablishes driving contact with its disk lug 33. However, as soon as the driving relation has been effected and assuming that the camming tendency is sufficient to position the actuator outwardly in its stroke-shortening location such lifting of the actuator will follow. This elevated position of the actuator is secured by the inertia of the disk and will be maintained throughout the remainder of the stroke by the friction in the driving engagement of the selected step portion with the shoulder, as depicted in Fig. 5. Therefore, the kicker movement across the dead center position will be advanced to effect an earlier shifting of the valve. From Fig. 4 it will be observed that the outwardly converging portions constitute a radially tapering active part which is moved centrifugally in response to increased motor speed to shorten the fluid imparted stroke by advancing the timing of kicker actuation.

Upon the next stroke of the piston the inertia of the weighted member 32 will bring the companion lug into active relation with its associated shoe and maintain the actuator in the time advancing position. While there is a tendency for the spring 30 to restore the actuator to its innermost position where it seats upon the shaft, the interval between the release of one lug and the engagement of the companion lug is so brief that the actuator practically remains in its time advancing position until the speed of the motor returns to normal.

From the foregoing it will be observed that when the motor is operating at the preset normal speed of operation the narrowest part of the active portion 27 will engage the shoulders 25 to obtain a maximum piston stroke. Should the available suction increase in intensity and thereby cause the motor to accelerate to higher speed of operation, in which the inertia in the weighted disk 32 overcomes the resistance offered by the spring 30, the actuator will be lifted by the lugs 33 along the pin 28 to effect an earlier operation of the kicker. This advanced operation is therefore determined by a speed controlled means which acts in response to the motor speed for shortening the stroke of the piston sufficiently to compensate for the overtravel of the wiper. The result is that the wiper will have a wiper movement at the higher speed substantially equal to the normal wiping stroke.

To facilitate the mounting of the actuator the latter is formed with a lateral recess 35 in its back face to enable placement of the actuator over the connecting pin 28 in an interlocking manner after first passing the shaft through the spring receiving opening 31. Thereafter the inertia member 32 is placed on the shaft extension 3' and secured rotatably thereon by a retaining washer 36 and split ring 37.

The construction is of simple form and while the foregoing description has been given in detail, it is obvious that the principles herein involved are capable of assuming other physical embodiments without departing from the spirit and scope of the invention claimed.

What is claimed is:

1. A windshield cleaner comprising a fluid motor having an actuating shaft, a wiper operatively connected to the shaft for being oscillated thereby, means operable by the motor for reversing the fluid pressure applications to the moving part of the motor, the arrangement being such that the wiper develops a degree of overtravel at the end of each stroke when operating at a high speed, and means for timing the reversal of the pressure applications in accordance with the speed of operation of the motor to compensate for the overtravel whereby the wiper stroke will be substantially uniform.

2. In combination a fluid motor having an actuating shaft, a member operatively connected to the shaft for being oscillated thereby, means operable by the motor for reversing the fluid pressure applications to the moving part of the motor, and speed responsive means for advancing the time of reversing the pressure differential to shorten the stroke of the member and thereby prevent an overriding of the latter beyond the normal stroke.

3. A windshield cleaner comprising a fluid motor having an actuating shaft, a wiper operatively connected to the shaft for being oscillated thereby and subject to a whipping tendency at the end of each stroke during high speed operation, means operable by the motor for reversing the fluid pressure applications to the driving part of the motor, and speed responsive means operable to shorten the stroke of the wiper during high speed operation whereby to maintain a substantially uniform wiper stroke for the different wiper speeds.

4. A fluid motor comprising an oscillatory shaft, a valve, an oscillatory kicker operable to move the valve from one to the other of two operative positions, an actuator having parts straddling the shaft and normally seating thereon, a pin carried by the shaft and interlocking with the actuator to drive the same with the shaft, said actuator being movable radially along the pin, said kicker having spaced shoulders between which the actuator is adjustable along the pin, means resiliently urging the actuator to its innermost position, and rotatable speed responsive means operatively connected to the actuator for urging the actuator outwardly, the relationship between the actuator and the shoulders being such that the outward movement of the actuator under the urge of the speed responsive means will effect an earlier operation of the kicker.

5. A fluid motor having a member movable back and forth by fluid pressure, an oscillatory drive shaft, an inertia member resiliently connected thereto to be oscillated thereby, valve means operable to reverse the pressure differential on the first member, and means operable by the inertia member when moving under its own inertia against the resilient connection for correspondingly changing the time of functioning of the valve means.

6. A fluid motor having a member movable back and forth by fluid, a drive shaft oscillated thereby, valve means for reversing the fluid pressure differential on said member, and speed responsive means operable to advance the functioning of said valve means to shorten the fluid imparted stroke of said member as the motor speed increases.

7. A fluid motor having a member movable back and forth by fluid, a drive shaft oscillated thereby, valve means for reversing the fluid pressure differential on said member, and including a spring actuated kicker movable back and forth across a position of maximum spring distortion for being actuated by its spring to operate the valve means, and means responsive to the speed of oscillation of the shaft to regulate the time of functioning of said valve means to determine the stroke of said member.

8. A fluid motor having a member movable back and forth by fluid, a drive shaft oscillated thereby, valve means for reversing the fluid pressure differential on said member, and including a spring actuated kicker movable back and forth across a position of maximum spring distortion for being actuated by its spring to operate the valve means, means adjustable to regulate the time of functioning of said valve means to determine the stroke of said member, and means responsive to the motor speed for so adjusting the regulating means.

9. A fluid motor having a member movable back and forth by fluid, a drive shaft oscillated thereby, valve means for reversing the fluid pressure differential on said member, and including a spring actuated kicker movable back and forth across a position of maximum spring distortion for being actuated by its spring to operate the valve means, said kicker having spaced shoulders, an actuator having a converging series of face portions selectively engageable with the shoulders, said actuator being mounted for movement to selectively position the face portions for such engagement, and speed responsive means operable to so move the actuator.

10. A valve action for operatively reversing the fluid pressure differential in a motor, comprising a valve kicker movable back and forth between two positions, resilient means for moving the kicker first to one position and then to the other position from a predetermined location to which it has been initially moved by the motor, and means operable in accordance with an increase in the motor speed to advance the time of functioning of the kicker.

11. A valve action for operatively reversing the fluid pressure differential in a motor, comprising a valve kicker movable back and forth between two positions, resilient means for moving the kicker first to one position and then to the other position from an intermediate location, means operable by the motor for disposing the kicker in such intermediate location, and speed responsive means operable to advance the functioning of said disposing means in accordance with an increase in the motor speed.

12. A fluid motor having a member movable back and forth by fluid, a drive shaft oscillated thereby, valve means for reversing the fluid pressure differential on said member, and including a spring actuated kicker movable back and forth across a position of maximum spring distortion for being actuated by its spring to operate the valve means, said kicker having spaced shoulders, an actuator having a converging series of face portions selectively engageable with the shoulders, said actuator being mounted for movement to selectively position the face portions for such engagement, a weighted disk rotatable on the shaft and having a pair of lift portions at opposite sides of the shaft, resilient means normally holding the actuator seated on the lift portions, means operatively connecting the actuator to the shaft to be oscillated thereby, and said lift portions constituting a driving connection between the actuator and the disk and operating in such manner at the end of each stroke to permit the disk continuing its movement relative to the actuator and against the urge of said resilient means to cause one or the other of said lift portions to so move the actuator into such selective position for advancing the kicker actuation during fast motor operation to shorten the travel of said member.

13. A fluid motor having a member movable back and forth by fluid, a drive shaft oscillated thereby, valve means for reversing the fluid pressure differential on said member, and including a spring actuated kicker movable back and forth across a position of maximum spring distortion for being actuated by its spring to operate the valve means, said kicker having spaced shoulders, an actuator having a converging series of face portions selectively engageable with the shoulders, said actuator being mounted for movement to selectively position the face portions for such engagement, a weighted disk rotatable on the shaft and having a pair of lift portions at opposite sides of the shaft, a cross pin on the shaft interlocking detachably with the actuator and on one end of which the actuator is slidable radially, a spring connecting the opposite end of the pin to the actuator and acting to hold the latter yieldably seated on both lift portions in such manner that the inertia of the disk at the end of the motor strokes will cause first one lift portion and then the other to urge the actuator outwardly along the pin whereby to selectively position said face portions for advancing the time of functioning of the kicker.

14. A valve action for a fluid motor having an oscillatory shaft, comprising valve means for operatively applying a fluid pressure differential to the motor, a spring actuated kicker movable back and forth across a position of maximum spring distortion for being actuated by its spring to operate the valve means, said kicker having spaced shoulders, an actuator having plural active parts selectively engageable with the shoulders to vary the time of function of the valve means, and means responsive to the speed of operation of the shaft for positioning the actuator to select the active part and thereby determine the moment of functioning of the valve means.

15. In a fluid motor having back and forth strokes, a snap valve action for operatively reversing the pressure differential comprising a valve movable back and forth between two operative positions, resilient means operable by a moving part of the motor for so moving the valve, and stroke regulating means operable in response to the motor speed to vary the time of valve actuation and thereby modify the stroke in accordance with speed increase.

16. A shaft carried actuator for a snap action valve mechanism wherein an oscillatory valve is snapped from one to the other of two operative positions by a kicker positioned spring, the time of functioning of the spring being determined by the actuator, said actuator having an active part with a progressive arrangement of kicker actuating face portions selectively positionable in response to motor speed to vary the time of functioning of the kicker and thereby regulate the stroke of the motor, said actuator having a part for movably mounting the same whereby it may be adjusted to selectively dispose the face portions for actuating the kicker.

17. A shaft oscillated inertia member for adjusting the actuator of a snap action valve mechanism wherein the actuator is adapted to be lifted to selectively present one of a plurality of active face portions to a spring shifting kicker to vary the time of valve actuation, comprising a weighted disk adapted for relative rotary movement on a shaft and having spaced lift portions on opposite sides of the shaft mounting for so lifting the actuator during such relative rotary movement.

18. A fluid motor having a chamber and a fluid operable member therein, an actuating shaft oscillated by the member, a valve movable back and forth for reversing the pressure differential on the member, a kicker for so moving the valve and having spaced shoulders, and an actuator oscillatable by the shaft and having an active part interposed between the shoulders for alternate engagement therewith, said part having variably effective portions movable in response to changes in speed for varying the time of actuation of the kicker.

19. A fluid motor having a chamber and a piston therein, an actuating shaft oscillated by the piston, a valve movable for reversing the pressure differential on the piston, a valve moving kicker having spaced shoulders, an actuator oscillatable by the shaft and having an active part interposed between the shoulders for alternate engagement therewith, said part having portions movable in response to a change in speed for regulating the time of functioning of the kicker, and an inertia member driven from the shaft through the actuator, said inertia member being rotatably supported on the shaft and acting under its inertia to so move said portions of the active part.

20. A fluid motor having a chamber and a piston therein, an actuating shaft oscillated by the piston, valve means for reversing the pressure differential on the piston and including a kicker, said kicker having spaced shoulders, an actuator oscillatable by the shaft and having an active part interposed between the shoulders for alternate engagement therewith, said part having portions adjustable for selectively determining the time of actuation of the kicker, and an inertia member rotatably supported on the shaft and having a part engageable by the actuator for so adjusting said portions.

ANTON RAPPL.